United States Patent
Sakaguchi et al.

(10) Patent No.: US 8,843,297 B2
(45) Date of Patent: Sep. 23, 2014

(54) RPM CONTROL DEVICE AND RPM CONTROL METHOD FOR A GENERAL-PURPOSE ENGINE

(75) Inventors: Ryo Sakaguchi, Chiyoda-ku (JP); Yasuhiko Ishida, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 13/614,720

(22) Filed: Sep. 13, 2012

(65) Prior Publication Data

US 2013/0276750 A1 Oct. 24, 2013

(30) Foreign Application Priority Data

Apr. 18, 2012 (JP) ................. 2012-094664

(51) Int. Cl.
*F02D 9/02* (2006.01)
(52) U.S. Cl.
USPC ........... 701/103; 123/350; 123/352; 123/361; 123/376; 123/391
(58) Field of Classification Search
USPC ........... 701/103; 123/350, 352, 361, 376, 391
See application file for complete search history.

(56) References Cited

U.S. PATENT DOCUMENTS 7,941,263 B2 * 5/2011 Nishi et al. ................ 701/104
8,484,969 B2 * 7/2013 Shiomi et al. ............. 60/605.2
2011/0203556 A1 * 8/2011 Shiomi et al. ............. 123/559.1
2012/0312276 A1 * 12/2012 Furuichi .................... 123/395
2013/0276751 A1 * 10/2013 Raasch ...................... 123/352

FOREIGN PATENT DOCUMENTS

| JP | 62-103447 A | 5/1987 |
| JP | 2003-041963 A | 2/2003 |
| JP | 2006-112280 A | 4/2006 |
| JP | 4247374 B2 | 4/2009 |
| JP | 4580951 B2 | 11/2010 |
| JP | 2011-132836 A | 7/2011 |

OTHER PUBLICATIONS

Japanese Office Action, dated Feb. 26, 2013, JPA No. 2012-094664.

* cited by examiner

*Primary Examiner* — Erick Solis
(74) *Attorney, Agent, or Firm* — Sughrue Mion, PLLC

(57) ABSTRACT

Provided is an rpm control device for a general-purpose engine, which is capable of realizing droop control in a spark-ignition engine only by the adaptation of isochronous control. When the droop control is selected, a rotation decrease rate (K) (value equal to or smaller than 1) is obtained from an engine rpm and a load. The result of multiplication of a basic target rpm (Nb) requested by a driver by the rotation decrease rate (K) is obtained as a target rpm (No). By setting the rotation decrease rate to a smaller value as the load becomes higher, the target rpm (No) is set smaller than the basic target rpm (Nb). The isochronous control is performed by using an electronic throttle so as to achieve the obtained target rpm (No) to realize the droop control in a pseudo-manner.

6 Claims, 10 Drawing Sheets

RPM CONTROL DEVICE AND RPM CONTROL METHOD FOR A GENERAL-PURPOSE ENGINE

BACKGROUND OF THE INVENTION

1. Field of the Invention

The present invention relates to a control device and a control method for a general-purpose engine, for controlling an rpm (rotation per minute) of a spark-ignition engine including an electronic throttle provided in an intake passage, and more particularly, to an rpm control device and an rpm control method for a general-purpose engine, for performing droop control by reducing an engine rpm along with an increase in engine load.

2. Description of the Related Art

An electronic governor mechanism is conventionally known as a control device for a general-purpose engine. For example, an electronic governor mechanism for a compression-ignition engine (diesel engine) is a control device which controls a fuel injection amount of the engine so as to stabilize an engine rpm at a target rpm. As methods for controlling the fuel injection amount, isochronous control and droop control are known.

In the isochronous control, when a load of the engine fluctuates to generate a deviation between the target rpm and an actual rpm, the fuel injection amount is controlled so as to eliminate the deviation. The compression-ignition engine corrects the fuel injection amount to control the rpm so as to maintain it at the target rpm.

On the other hand, in the droop control, when the load is applied to the engine, the fuel injection amount is controlled so that the engine rpm is reduced in accordance with a magnitude of the load. In the compression-ignition engine, the fuel amount is increased by a predetermined amount in accordance with the deviation between the target rpm and the actual rpm. When an external load overwhelms a torque generated by the engine, the engine rpm is controlled so as to be reduced (see Japanese Patent Application Laid-open No. 2008-231939, for example).

Virtual droop control corresponding to the combination of the isochronous control and the droop control has also been proposed (see Japanese Patent Application Laid-open No. 2000-110635, for example).

In the virtual droop control described in Japanese Patent Application Laid-open No. 2000-110635, control characteristics of a mechanical governor are realized by an electronic governor. In vessel engines, farm-vehicle engines, and construction-work vehicle engines, the engine rpm is reduced in accordance with an increase in engine load so that the degree of application of the load can be obtained based on the reduction in engine rpm. In the virtual droop control, engine-operation performance suited for a feeling of a driver is to be realized in the manner described above. Moreover, although a feeling of discomfort is provided to the driver when sudden acceleration or deceleration is performed at the time of acceleration or deceleration in the case of the isochronous control, such a feeling of discomfort can be reduced in the case of the droop control.

Therefore, the engine rpm can be controlled to the target rpm with high accuracy by using the isochronous control with the electronic governor in some kinds of real machines or vehicles having the control device. However, rotation control (virtual droop control) similar to the droop control with the conventional mechanical governor characteristics is demanded for the general-purpose engine.

Conventionally, the general-purpose engine is generally used for vessels, farm vehicles, and construction-work vehicles. Therefore, compression-ignition engines (diesel engines) are mainly used as the general-purpose engine. In recent years, however, in view of environmental protection such as gas emission performance, a reduction in cost, and a reduction in size as well as in weight, a spark-ignition engine (gasoline/LPG) has been used. Therefore, when the spark-ignition engine (gasoline/LPG) is used as the general-purpose engine, output characteristics close to those of the conventional diesel engine and an operational feeling without a feeling of discomfort are demanded.

Conventionally, the mechanical governor is mainly used in the spark-ignition engine (gasoline/LPG) in which the rpm control is performed. In that case, an rpm of a throttle valve is controlled to a target rpm by an external mechanical governor mechanism. Therefore, when steady stability is considered as an important point, responsiveness is degraded. On the other hand, when the responsiveness is considered as an important point, the steady stability is lowered. In the worst case, hunting occurs in the rpm. Therefore, in terms of control accuracy for the target rpm, the diesel engine is better than the spark-ignition engine.

SUMMARY OF THE INVENTION

The present invention has been made to solve the problem described above, and therefore has an object to provide an rpm control device and an rpm control method for a general-purpose engine, which are capable of reducing a target rpm along with an increase in engine load in a spark-ignition engine and performing isochronous control with the reduced target rpm so as to perform pseudo-droop control by using the isochronous control even in the general-purpose engine requiring droop control.

According to an exemplary embodiment of the present invention, there is provided an rpm control device for a general-purpose engine, for controlling an intake-air amount to be supplied to an engine by using an electronic throttle to control an rpm of the engine, the rpm control device including: an rpm detecting section for detecting the rpm of the engine; an intake-air temperature detecting section for detecting a temperature of intake air of the engine; an intake-air detecting section for detecting one of an intake-air amount and an intake pressure of the intake air; an engine-load detecting section for detecting a load of the engine by using the temperature of the intake air of the engine, detected by the intake-air temperature detecting section, and one of the intake-air amount and the intake pressure, detected by the intake-air detecting section; a basic target-rpm calculating section for calculating a basic target rpm of the engine based on input of an accelerator operation; a target decrease-rate calculating section for calculating a rotation decrease rate based on the basic target rpm and the load of the engine; a target-rpm calculating section for calculating a target rpm based on the basic target rpm and the rotation decrease rate; a target throttle opening-degree calculating section for calculating a rotation deviation between the rpm of the engine and the target rpm so as to calculate a target throttle opening degree of the electronic throttle based on the rotation deviation; and an electronic-throttle control section for controlling an opening degree of the electronic throttle so that an actual opening degree of the electronic throttle becomes equal to the target throttle opening degree, in which the target rpm is made smaller than the basic target rpm by setting the rotation decrease rate to a small value in accordance with an increase in the load of the engine and isochronous control is performed by using the electronic throttle so as to achieve the obtained target rpm to perform droop control in a pseudo-manner.

According to the exemplary embodiment of the present invention, the rpm control device for a general-purpose engine, for controlling the intake-air amount supplied to the engine by using the electronic throttle to control the rpm of the engine, includes: the rpm detecting section for detecting the rpm of the engine; the intake-air temperature detecting section for detecting the temperature of intake air of the engine; the intake-air detecting section for detecting one of the intake-air amount and the intake pressure of the intake air; the engine-load detecting section for detecting the load of the engine by using the temperature of the intake air of the engine, detected by the intake-air temperature detecting section, and one of the intake-air amount and the intake pressure, detected by the intake-air detecting section; the basic target-rpm calculating section for calculating the basic target rpm of the engine based on the input of the accelerator operation; the target decrease-rate calculating section for calculating the rotation decrease rate based on the basic target rpm and the load of the engine; the target-rpm calculating section for calculating the target rpm based on the basic target rpm and the rotation decrease rate; the target throttle opening-degree calculating section for calculating the rotation deviation between the rpm of the engine and the target rpm so as to calculate the target throttle opening degree of the electronic throttle based on the rotation deviation; and the electronic-throttle control section for controlling the opening degree of the electronic throttle so that the actual opening degree of the electronic throttle becomes equal to the target throttle opening degree. Further, the target rpm is made smaller than the basic target rpm by setting the rotation decrease rate to a small value in accordance with the increase in the load of the engine and isochronous control is performed by using the electronic throttle so as to achieve the obtained target rpm to perform droop control in a pseudo-manner. Therefore, it is possible to reduce the target rpm along with an increase in engine load in the spark-ignition engine and perform isochronous control with the target rpm so as to perform pseudo-droop control by using the isochronous control even in the general-purpose engine requiring droop control.

DETAILED DESCRIPTION OF THE PREFERRED EMBODIMENT

First Embodiment

Figure 1:
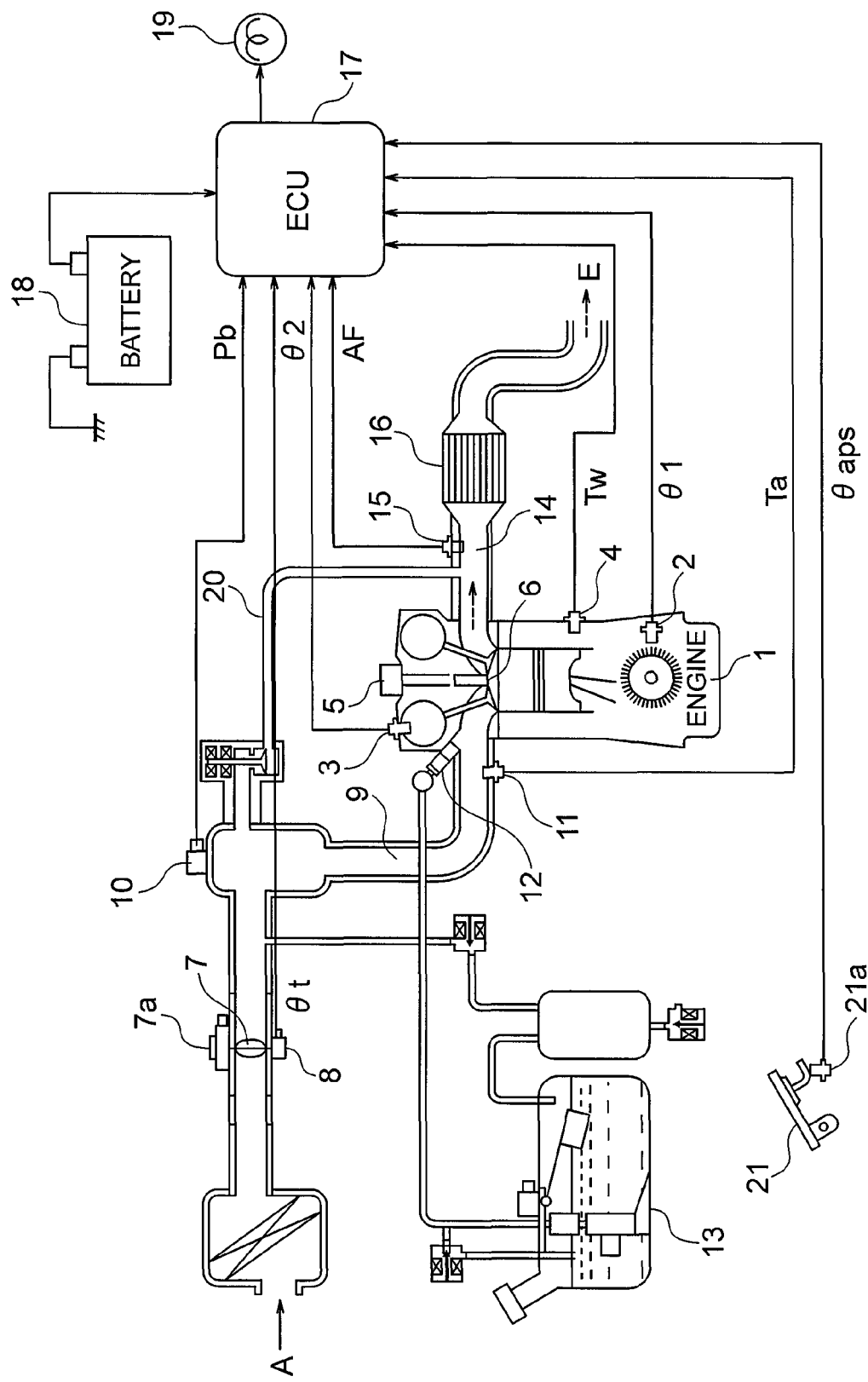
FIG. 1 is a configuration diagram illustrating the entire system of an rpm control device for a general-purpose engine according to a first embodiment of the present invention.

Hereinafter, a first embodiment of the present invention is described in detail referring to the accompanying drawings. In the drawings, the same or corresponding parts are denoted by the same reference symbols for description.

FIG. 1 is a configuration diagram illustrating the entire system of an rpm control device for a general-purpose engine according to the first embodiment of the present invention, schematically illustrating the relationship between an internal combustion engine and the control device.

In FIG. 1, a general-purpose engine 1 (hereinafter, referred to simply as "engine 1") which is a target to be controlled is illustrated. The rpm control device for the general-purpose engine according to this embodiment includes, as illustrated in FIG. 1, a crank-angle sensor 2, a cam-angle sensor 3, a water-temperature sensor 4, an ignition coil 5, a spark plug 6, a throttle valve 7, a throttle actuator (electronic throttle) 7a, a throttle sensor 8, an intake passage 9, an intake-pressure sensor 10, an intake-air temperature sensor 11, an injector 12, a fuel pump 13, an exhaust passage 14, an $O_2$ sensor 15, a three-way catalyst 16, an electronic control unit (ECU) 17, a battery 18, an fault indicator 19, an EGR passage 20, an accelerator pedal 21, and an accelerator-position sensor 21a.

The ignition coil 5, the spark plug 6, and the injector 12 are mounted to the engine 1. In addition, the intake passage 9 and the exhaust passage 14 are brought into communication with the engine 1 through the intermediation of an intake valve and an exhaust valve, respectively. By control of the ECU 17, a fuel amount to be supplied from the injector 12 to the engine 1 is calculated in accordance with a load of the engine 1 so as to achieve a target air/fuel ratio. Moreover, by the control of the ECU 17, optimal ignition timing by the spark plug 6 is calculated based on an engine rpm and the engine load. Further, by the control of the ECU 17, an optimal air amount to be supplied to the engine 1 is calculated to adjust an air amount by the throttle actuator (electronic throttle) 17a.

The EGR passage 20 brings the exhaust passage 14 and the intake passage 9 into communication with each other through the intermediation of an EGR valve.

The throttle valve 7 for adjusting an intake-air amount flowing into the engine 1 and the throttle actuator 7a for driving the throttle valve 7 to be opened and closed are provided to the intake passage 9.

On the other hand, the three-way catalyst 16 for purifying an exhaust gas E exhausted from the engine 1 is provided in the exhaust passage 14.

Various analog output sensors for detecting an operating state and a load state of the engine 1 are explained below. The crank-angle sensor 2 detects a crank angle $\theta 1$. The cam-angle sensor 3 detects a cam angle $\theta 2$. The water-temperature sensor 4 detects an engine cooling-water temperature Tw. The intake-air temperature sensor 11 detects a temperature Ta of intake air A.

The throttle sensor 8 detects an angle $\theta t$ of the throttle valve 7. The intake-pressure sensor 10 is provided at downstream of the throttle valve 7 and detects a pressure Pb in the intake passage 9. The $O_2$ sensor 15 is provided at upstream of the three-way catalyst 16 and outputs a detection value AF corresponding to an oxygen concentration (air/fuel ratio) in the exhaust passage 14.

The injector 12 injects the fuel (gasoline) supplied by the fuel pump 13 provided to a fuel tank into the intake passage 9 corresponding to each cylinder of the engine 1. The ignition coil 5 supplies electric power energy to the spark plug 6. The spark plug 6 ignites an air-fuel mixture by using a discharge spark.

The accelerator-position sensor 21a is mounted to the accelerator pedal 21. The accelerator-position sensor 21a detects an accelerator position $\theta aps$ corresponding to the amount of pedal operation performed by a driver. Although an analog sensor is illustrated as the accelerator-position sensor 21a in FIG. 1, digital information from a switch or the like or communication information from another unit of a controller area network (CAN) or the like may also be used instead.

The various sensors described above are described as examples, and therefore all the various sensors are not required to be included as constituent elements of the first embodiment of the present invention. Thus, only a part of the various sensors described above may be provided or other sensor (s) other than those described above may be additionally provided.

The detection information of the various sensors described above is input to the ECU 17.

The ECU 17 calculates a control amount for controlling the engine 1 based on the crank angle $\theta 1$ from the crank-angle sensor 2, the cam angle $\theta 2$ from the cam-angle sensor 3, and input information from the other various sensors so as to control the driving of various actuators such as the ignition coil 5, the throttle actuator 7a, and the injector 12.

The ECU 17 calculates a fuel injection amount based on the air amount supplied to the engine 1 in accordance with the load on the engine 1 so as to achieve a theoretical air/fuel ratio (target air/fuel ratio) and supplies the fuel from the injector 12 to the engine 1 based on the thus calculated injection amount. The ECU 17 also calculates optimal ignition timing from an rpm RE of the engine 1 and a load Ce on the engine 1 to perform ignition at the spark plug 6. Moreover, the ECU 17 controls the air amount to be supplied to the engine 1 by the throttle actuator (electronic throttle) 7a.

Moreover, the ECU 17 calculates an engine rpm (basic target rpm Nb) desired by the driver based on the accelerator position $\theta aps$ from the accelerator-position sensor 21a to calculate a target rpm No based on a product of the basic target rpm Nb and a target decrease rate K so as to control the driving of the throttle actuator (electronic throttle) 7a. The ECU 17 sets a torque-limit value for each target rpm in advance, and performs control for reducing the target rpm No when a torque generated by the engine 1 exceeds the torque-limit value.

The battery 18 is connected to the ECU 17. The battery 18 supplies electric power for an engine start or to various electric components such as a light.

When a fault occurs in any of the parts, the fault indicator 19 receives a signal from the ECU 17 to display the occurrence of the fault.

Figure 2:
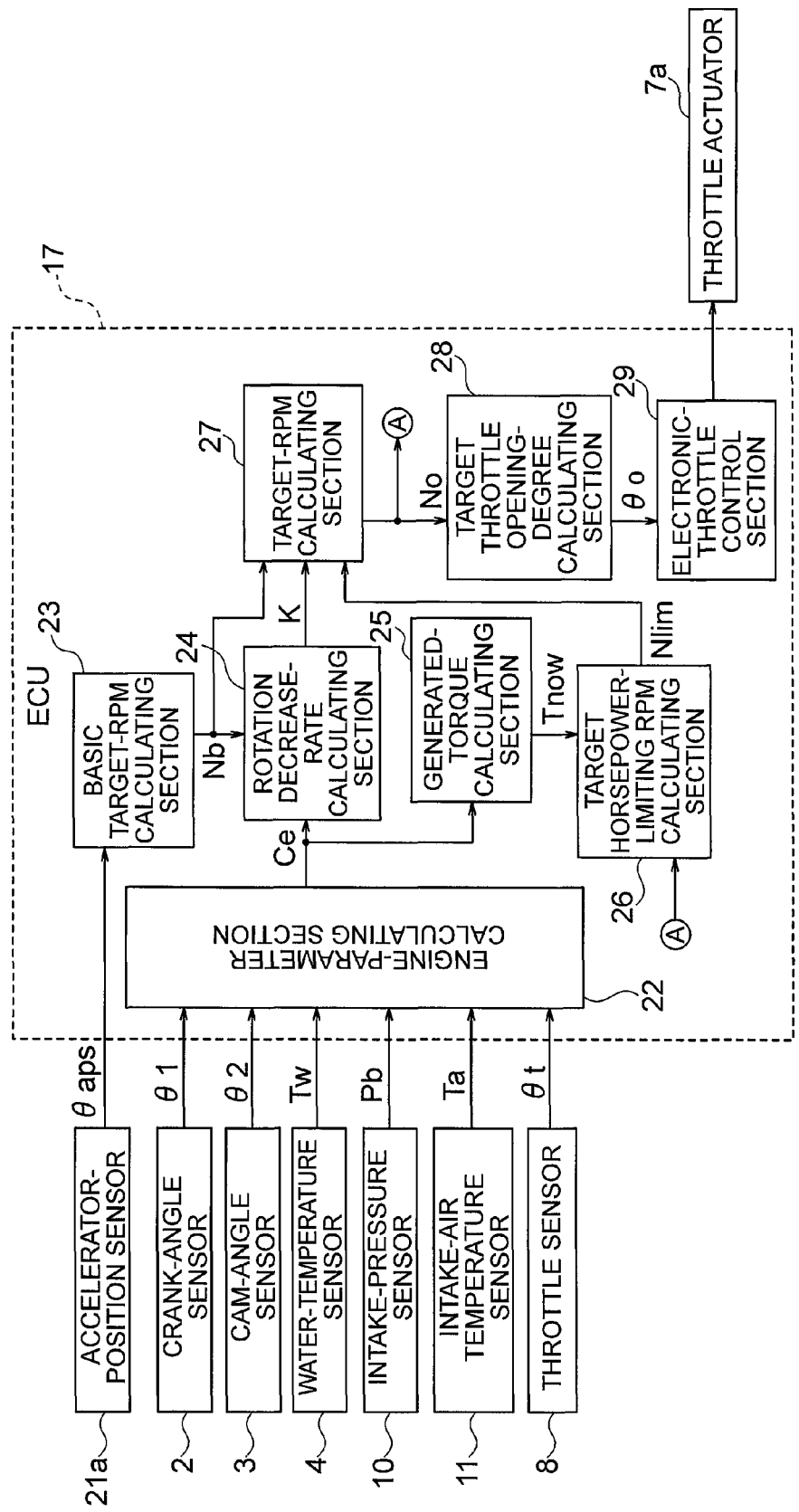
FIG. 2 is a block diagram illustrating a functional configuration of the rpm control device for the general-purpose engine according to the first embodiment of the present invention.

FIG. 2 is a block diagram illustrating a functional configuration of the ECU 17 and mainly illustrates only the functions relating to the calculation of the target rpm and the computation of a target throttle opening degree.

In FIG. 2, the ECU 17 includes an engine-parameter calculating section 22, a basic target-rpm calculating section 23, a rotation decrease-rate calculating section 24, a generated-torque calculating section 25, a section 26 for calculating a target rpm for limiting horsepower (hereinafter, referred to as target horsepower-limiting rpm calculating section 26), a target-rpm calculating section 27, a target throttle opening-degree calculating section 28, an electronic-throttle control section 29, and various actuator control sections (such as a fuel control section, an ignition control section) (not shown).

The engine-parameter calculating section 22 obtains the load (charging efficiency) Ce of the engine 1 based on the temperature Ta of the intake air A, which is output from the intake-air temperature sensor 11, and the pressure Pb in the intake passage 9 (or the intake-air amount of the engine 1), which is output from the intake-pressure sensor 10. When the intake-air amount of the engine 1 is used, the intake-air amount is calculated based on the angle $\theta t$ of the throttle valve 7 which is output from the throttle sensor 8. However, the present invention is not limited thereto, and the engine-parameter calculating section 22 may obtain the load Ce of the engine 1, for example, based on at least two of the crank angle $\theta 1$ output from the crank-angle sensor 2, the cam angle $\theta 2$ output from the cam-angle sensor 3, the engine cooling-water temperature Tw output from the water-temperature sensor 4, the pressure Pb in the intake passage 9, which is output from the intake-pressure sensor 10, the temperature Ta of the intake air A, which is output from the intake-air temperature sensor 11, and the angle $\theta t$ of the throttle valve 7, which is output from the throttle sensor 8.

The basic target-rpm calculating section 23 calculates the basic target rpm Nb intended by the driver based on the accelerator position $\theta aps$ output from the accelerator-position sensor 21a.

The rotation decrease-rate calculating section 24 calculates the rotation decrease rate K for decreasing the rpm in accordance with the load of the engine based on the load (charging efficiency) Ce of the engine 1, which is obtained in the engine-parameter calculating section 22, and the basic target rpm Nb obtained in the basic target-rpm calculating section 23 when droop control is selected as a control method for the vehicle. As a method of selecting the control method for the vehicle, for example, the control method for the vehicle is switched by an operation of an external switch provided to the outside or is switched by data setting in the ECU 17.

Although not shown in FIG. 2, the crank angle θ1 serving as an operation criterion of the ECU 17 is input to each of the sections included in the ECU 17.

The generated-torque calculating section 25 calculates the torque generated by the engine 1 (hereinafter, referred to as "generated torque Tnow") based on the load Ce of the engine 1, which is obtained in the engine-parameter calculating section 22, and the engine rpm RE. The engine rpm RE may be calculated by, for example, an rpm sensor (actual-rpm detecting section).

The target horsepower-limiting rpm calculating section 26 calculates a target horsepower-limiting rpm Nlim by feedback control so that the torque generated in engine 1 does not exceed a torque-limit value Tlim which is preset for each target rpm No.

The target-rpm calculating section 27 calculates the target rpm No based on the basic target rpm Nb and the rotation decrease rate K. When the generated torque Tnow of the engine 1 exceeds the torque-limit value Tlim, the target rpm No is corrected based on the target horsepower-limiting rpm Nlim. The calculated target rpm No is input to the target throttle opening-degree calculating section 28 and the target horsepower-limiting rpm calculating section 26. After the calculation of the target rpm No, the throttle actuator 7a is operated by the target throttle opening-degree calculating section 28 and the electronic-throttle control section 29 to perform the feedback control so as to achieve the target rpm No.

In the case of isochronous control, the target throttle opening-degree calculating section 28 calculates a target throttle opening degree θo based on a deviation between the target rpm No and the actual rpm RE so as to eliminate the deviation in the feedback control (PID control). In the case of droop control, the target throttle opening-degree calculating section 28 calculates the target throttle opening degree θo for performing the droop control (pseudo-droop control) for reducing the engine rpm along with an increase in the load Ce of the engine 1 by the control device using an isochronous control method by performing isochronous control so that the actual rpm RE becomes equal to the target rpm No. A method of calculating the target throttle opening degree θo is described below.

The electronic-throttle control section 29 performs the feedback control so that the actual rpm RE becomes equal to the target rpm No by operating the throttle actuator 7a based on the target throttle opening degree θo to control the intake-air amount to be supplied to the engine 1.

The rpm control device for the general-purpose engine according to the first embodiment is configured so that a control method can be selected from two types of control, that is, the isochronous control and the droop control. As a method of switching the control method, the control method may be switched by an operation of an external selection switch or by data setting in the ECU 17. When the isochronous control is selected, the target throttle opening degree θo is calculated based on the deviation between the target rpm No and the actual rpm RE so as to eliminate the deviation in the feedback control (PID control). On the other hand, when the droop control is selected, the preset rotation decrease rate K is calculated from the actual rpm RE and the engine load Ce. Then, the target rpm No is obtained by multiplying the basic target rpm Nb from the driver by the rotation decrease rate K. The isochronous control is performed so as to achieve the obtained target rpm No. In this manner, the pseudo-droop control is performed.

Therefore, when the droop control is selected, the rotation decrease rate K (value equal to or smaller than 1) is obtained from the engine rpm RE and the load Ce. Then, the target rpm No is obtained by multiplying the basic target rpm Nb requested by the driver by the rotation decrease rate K. By setting the rotation decrease rate to a smaller value as the load becomes higher, the target rpm No is set to a value smaller than the basic target rpm Nb. Then, the isochronous control is performed by using the electronic throttle so as to achieve the obtained target rpm No. In this manner, the droop control is realized in a pseudo-manner. As a result, according to the present invention, only by the adaptation of the isochronous control to the spark-ignition engine, the droop control can be realized.

Moreover, in this embodiment, the torque-limit value Tlim (upper value) is set in advance for each value of the engine rpm. In the case where the generated torque Tnow of the engine 1 exceeds the torque-limit value Tlim when the rpm is controlled to the target rpm No, the target horsepower-limiting rpm Nlim is obtained so that the generated torque Tnow becomes equal to or smaller than the torque-limit value Tlim. The target rpm No is reduced by subtracting the horsepower-limiting rpm Nlim from the target rpm No, thereby performing the rpm control with the reduced target rpm No. In this manner, the generated torque Tnow is reduced to be equal to or smaller than the torque-limit value Tlim. On the other hand, when the generated torque Tnow of the engine 1 is equal to or smaller than the torque-limit value Tlim at the time of rpm control with the target rpm No, the target horsepower-limiting rpm Nlim is not required to be obtained.

Hereinafter, an operation according to the first embodiment of the present invention is described referring to flowcharts of FIGS. 3 to 5 and explanatory views of FIGS. 6 to 15 together with FIGS. 1 and 2.

Figure 3:
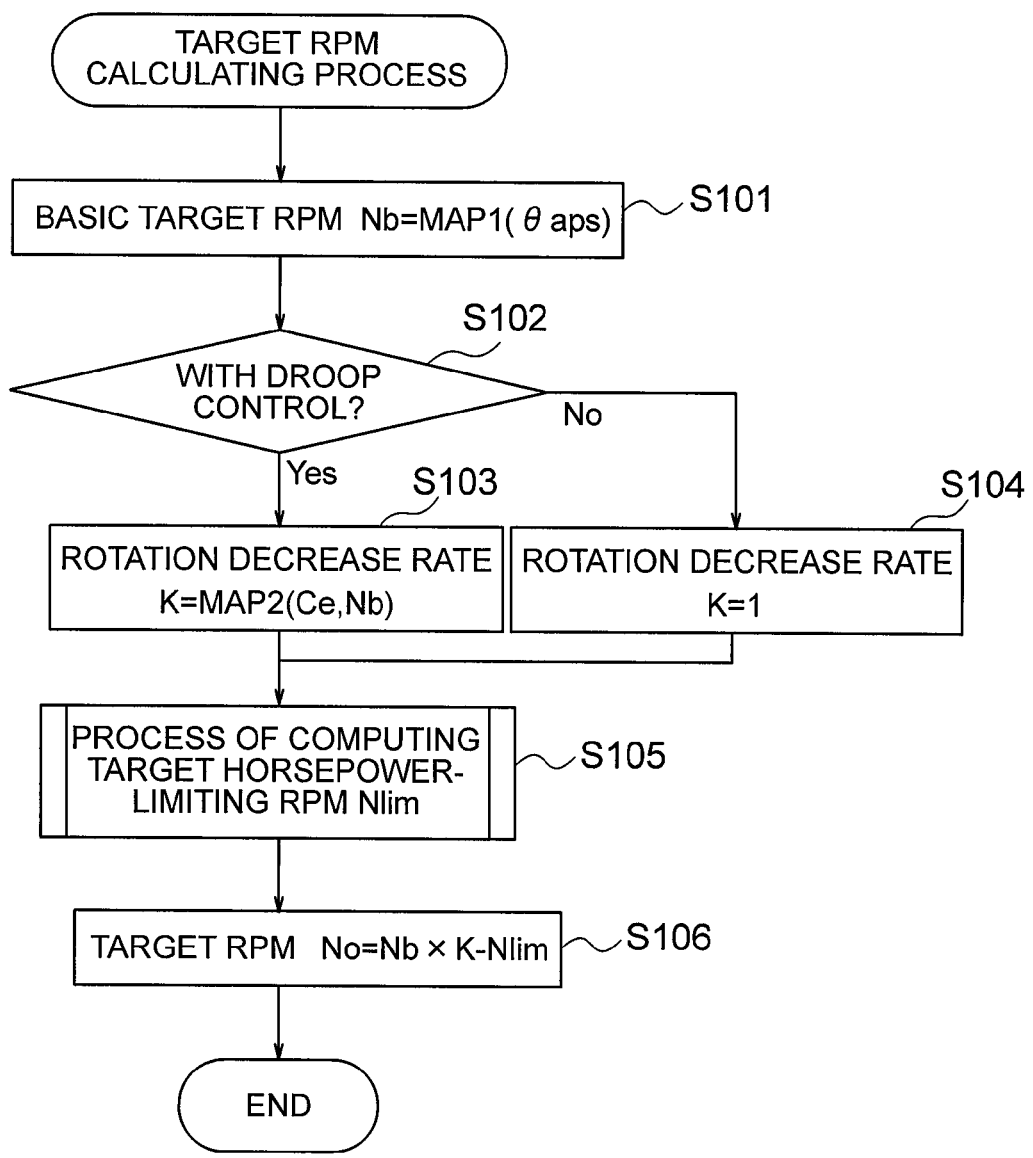
FIG. 3 is a flowchart of the rpm control device for the general-purpose engine according to the first embodiment of the present invention.
Figure 4:
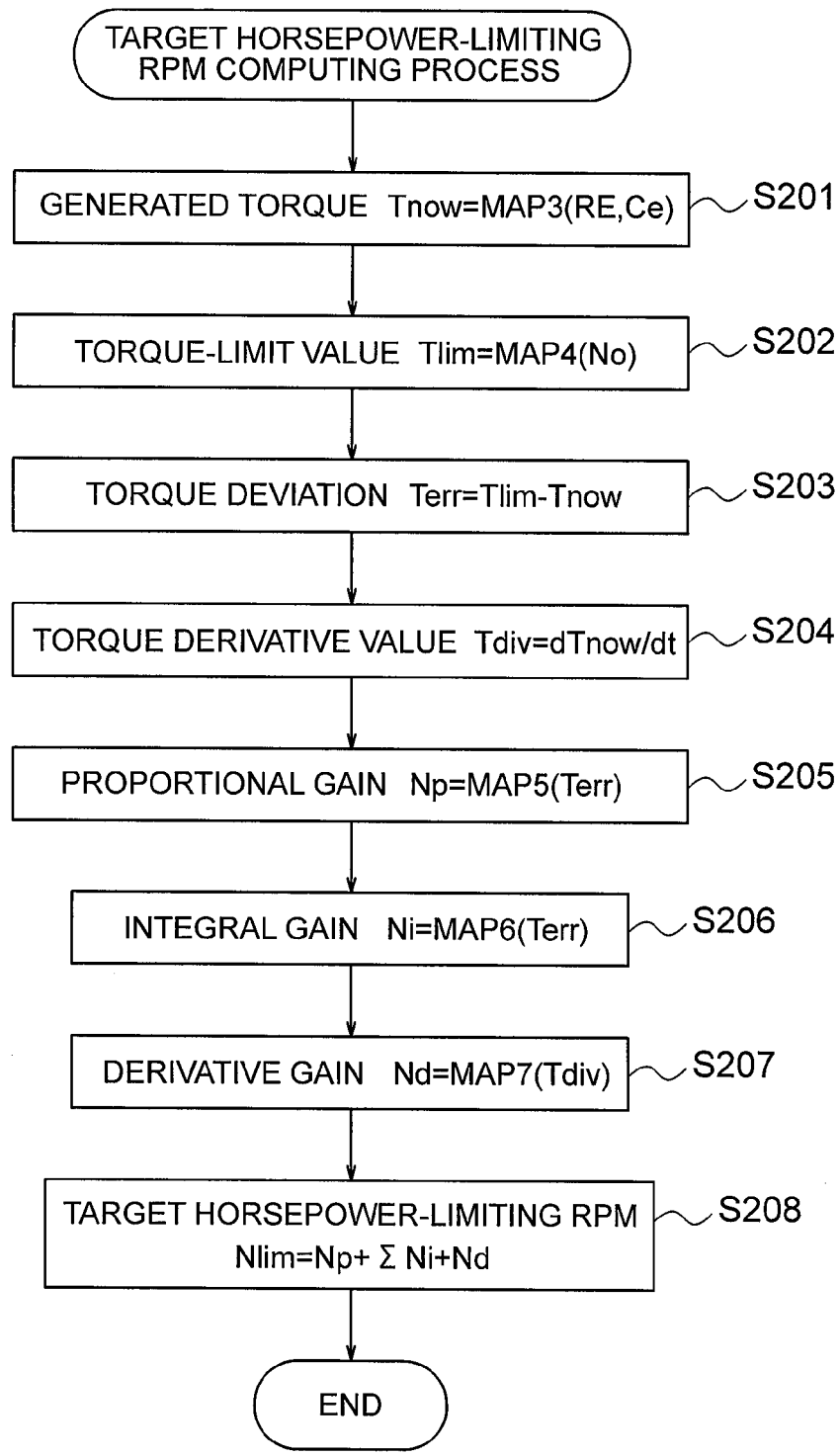
FIG. 4 is another flowchart of the rpm control device for the general-purpose engine according to the first embodiment of the present invention.
Figure 5:
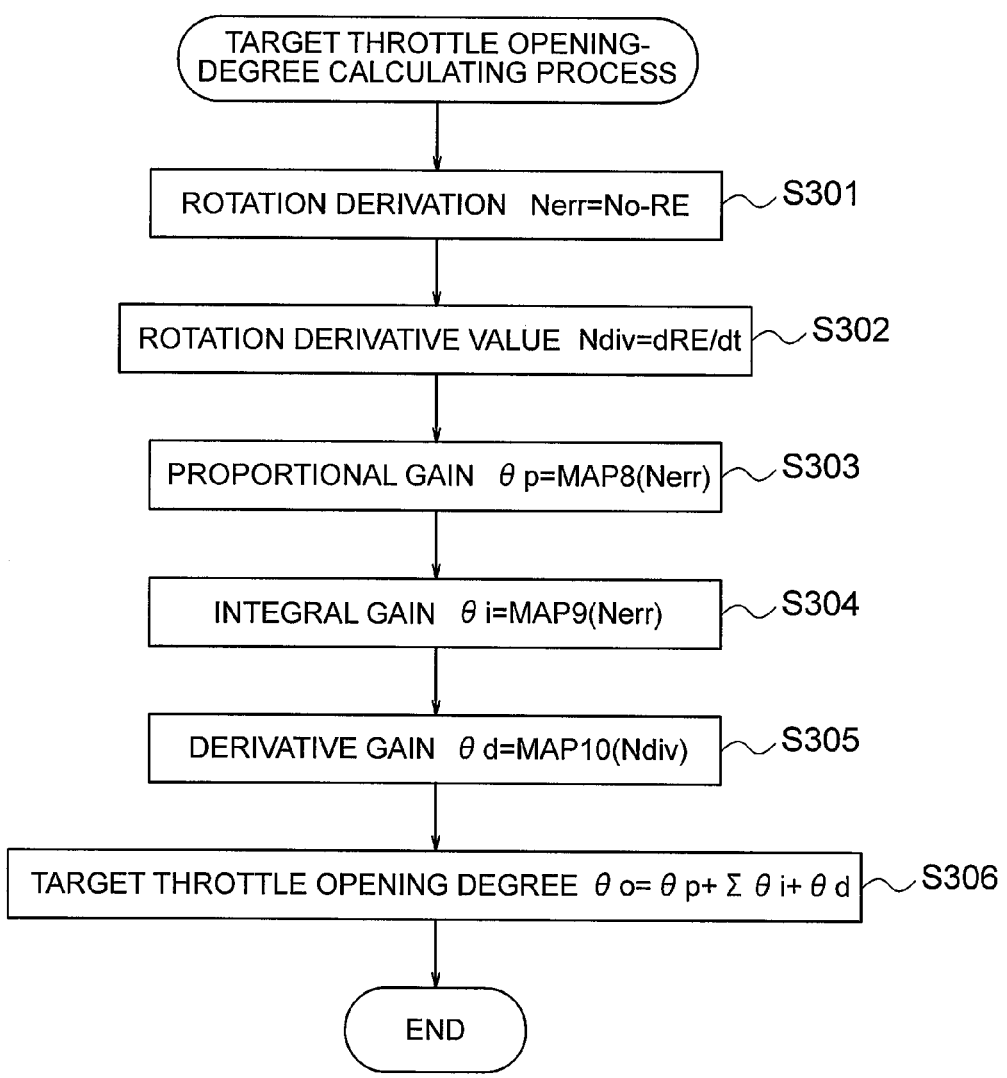
FIG. 5 is further another flowchart of the rpm control device for the general-purpose engine according to the first embodiment of the present invention.

FIG. 3 is a flowchart illustrating a process for calculating the target rpm No according to the first embodiment of the present invention, FIG. 4 is a flowchart specifically illustrating Step S105 (process for computing the target horsepower-limiting rpm Nlim) of FIG. 3, and FIG. 5 is a flowchart illustrating a process for performing the isochronous control on the target rpm No obtained by the process flow illustrated in FIG. 3 by using the throttle actuator (electronic throttle) 7a. The processes illustrated in the flowcharts of FIGS. 3 to 5 are executed by the ECU 17 in constant cycles (for example, 5 ms).

In FIG. 3, first, the basic target-rpm calculating section 23 makes a search for the target rpm through a preset basic target-rpm map MAP1 by using the accelerator position θaps to calculate the engine rpm (basic target rpm Nb) desired by the driver (Step S101).

Figure 6:
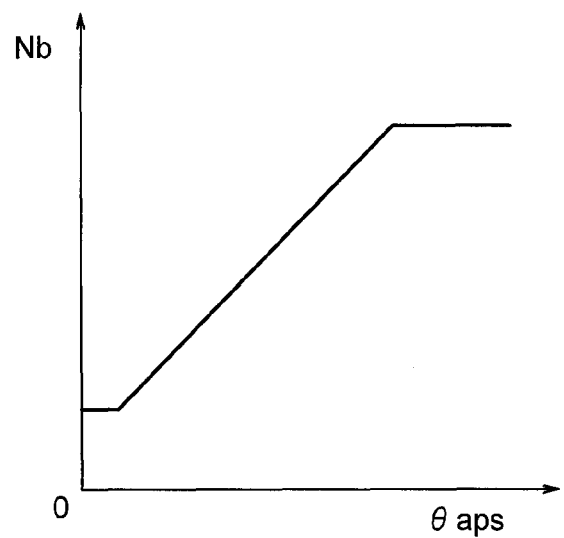
FIG. 6 is a graph showing an example of setting of a map of the rpm control device for the general-purpose engine according to the first embodiment of the present invention.

FIG. 6 shows an example of setting of the basic target-rpm map MAP1. As shown in FIG. 6, a value of the basic target rpm Nb is set for each value of the accelerator position θaps on the basic target-rpm map MAP1. Therefore, the value of the basic target rpm Nb can be uniquely obtained from the value of the accelerator position θaps.

Next, the rotation decrease-rate calculating section 24 determines whether the control method for the vehicle is currently set to the droop control or the isochronous control. As described above, for the vehicles using the general-purpose engines, there exist two types of vehicles, that is, a vehicle requiring the isochronous control and a vehicle requiring the droop control. Therefore, in this embodiment, the control method can be selected from the two types of control methods. As a method of selecting the control method, the control method can be switched by an external selection switch or the data in the ECU 17. When the control method for the vehicle is the droop control as a result of determination, the process proceeds to Step S103. On the other hand, when the control method for the vehicle is the isochronous control, the process proceeds to Step S104 (Step S102).

Figure 7:
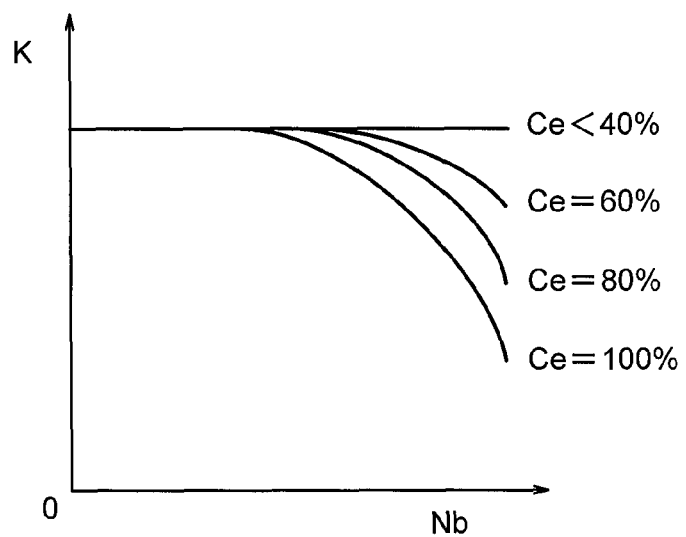
FIG. 7 is a graph showing an example of setting of another map of the rpm control device for the general-purpose engine according to the first embodiment of the present invention.

In Steps S103 and S104, the rotation decrease-rate calculating section 24 obtains the rotation decrease rate K. The rotation decrease rate K is a rate of decreasing of the rpm with respect to the basic target rpm Nb. In the case of the isochronous control, the basic target rpm Nb itself, which is requested by the driver through the accelerator pedal 21, may be output. Therefore, the rotation decrease rate K becomes 1 (Step S104). On the other hand, in the case of the vehicle using the droop control, a search is made through a preset rotation decrease-rate map MAP2 by using the basic target rpm Nb and the load (charging efficiency) Ce of the engine 1 to calculate the rotation decrease rate K (Step S103). The load (charging efficiency) Ce of the engine 1 is obtained by the engine-parameter calculating section 22. FIG. 7 shows an example of setting of the rotation decrease-rate map. As shown in FIG. 7, a value of the rotation decrease rate K is set for each value of the basic target rpm Nb and each value of the load (charging efficiency) Ce of the engine 1 on the rotation decrease-rate map MAP2. Therefore, the value of the rotation decrease rate K can be uniquely obtained from the value of the basic target rpm Nb.

Next, the target horsepower-limiting rpm calculating section 26 obtains the target horsepower-limiting rpm Nlim (Step S105). The general-purpose engine is mounted in various types of equipment such as vessels, farm equipment, and transport vehicles. Therefore, a maximum output horsepower is required to be changed in accordance with the type of equipment. This is because an input limit value of a driving system differs depending on the types of equipment. For example, in the case of some one vessel, the driving system can withstand an output up to 50 (PS). However, for the driving system of some one grass cutter, 30 (PS) is a maximum input value of the driving system. For mounting the common general-purpose engine in various types of equipment described above, it is required that a main body of the engine 1 be configured to be common to the various types of equipment and only data on the engine control side (namely, ECU 17) be changed for each of the types of equipment.

In order to realize the configuration described above, a mechanism which enables the setting of the maximum value (torque-limit value Tlim) of the generated torque for each target rpm is provided in this embodiment. When the generated torque Tnow of the engine 1 exceeds the torque-limit value Tlim, a correction is made so that the target rpm is lowered. In this manner, the engine 1 can be used while limiting the horsepower so that the horsepower becomes equal to or smaller than the maximum generated horsepower of the engine. A process for limiting the target rpm (process for computing the target horsepower-limiting rpm) is described referring to FIG. 4.

Figure 8:
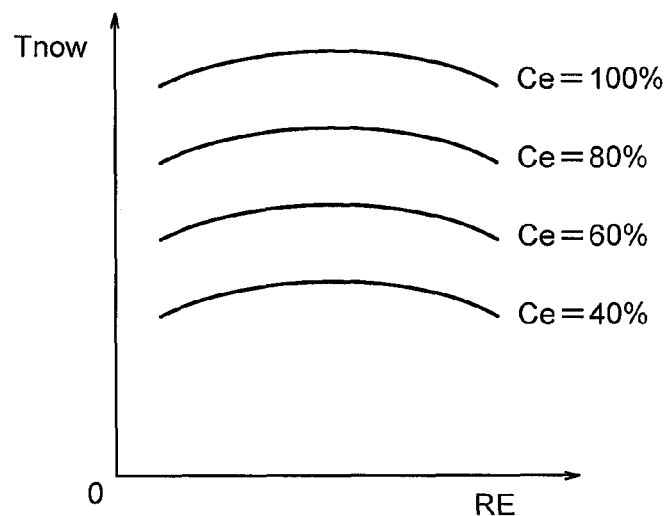
FIG. 8 is a graph showing an example of setting of further another map of the rpm control device for the general-purpose engine according to the first embodiment of the present invention.

First, the generated-torque calculating section 25 obtains the generated torque Tnow of the engine 1 from the current rpm RE and load (charging efficiency) Ce of the engine 1. The generated torque Tnow is obtained by retrieving (making a search) through a preset generated-torque map MAP3 by using the rpm RE and the load (charging efficiency) Ce of the engine 1 (Step S201). FIG. 8 shows an example of setting of the generated-torque map MAP3. As shown in FIG. 8, a value of the generated torque Tnow is set in advance for each value of the rpm RE and each value of the load (charging efficiency) Ce on the generated-torque map MAP3. Therefore, the value of the generated torque Tnow can be uniquely obtained from the value of the rpm RE and the value of the load (charging efficiency) Ce.

Figure 9:
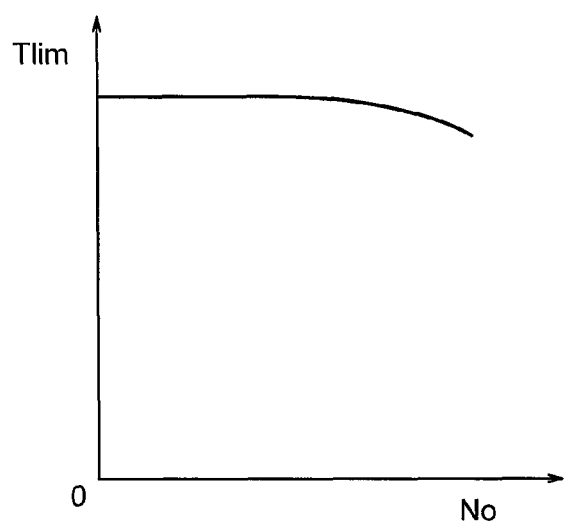
FIG. 9 is a graph showing an example of setting of further another map of the rpm control device for the general-purpose engine according to the first embodiment of the present invention.

Next, the target horsepower-limiting rpm calculating section 26 retrieving (makes a search for) the torque-limit value Tlim corresponding to the current target rpm No through a preset torque-limit map MAP4 on which the maximum value of the generated torque (torque-limit value Tlim) for each target rpm No is set in advance. By setting the torque-limit value Tlim for each target rpm No, the maximum horsepower can be limited (Step S202). FIG. 9 shows an example of setting of the torque-limit map MAP4. As shown in FIG. 9, a value of the torque-limit value Tlim is set in advance for each value of the target rpm No on the torque-limit map MAP4. Therefore, the value of the torque-limit value Tlim can be uniquely obtained from the value of the target rpm No.

Next, in Steps S203 and S204, the target horsepower-limiting rpm calculating section 26 obtains a torque deviation Terr and a torque derivative value Tdiv respectively so as to obtain the target horsepower-limiting rpm Nlim by the feedback control (PID control). The torque deviation Terr and the torque derivative value Tdiv are obtained by using the following Expressions (1) and (2).

$$Terr = Tlim - Tnow \quad (1)$$

$$Tdiv = dTnow/dt \quad (2)$$

Figure 10:
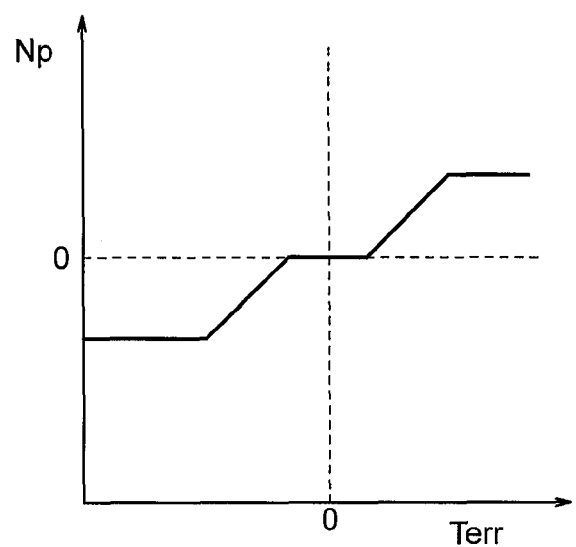
FIG. 10 is a graph showing an example of setting of further another map of the rpm control device for the general-purpose engine according to the first embodiment of the present invention.
Figure 11:
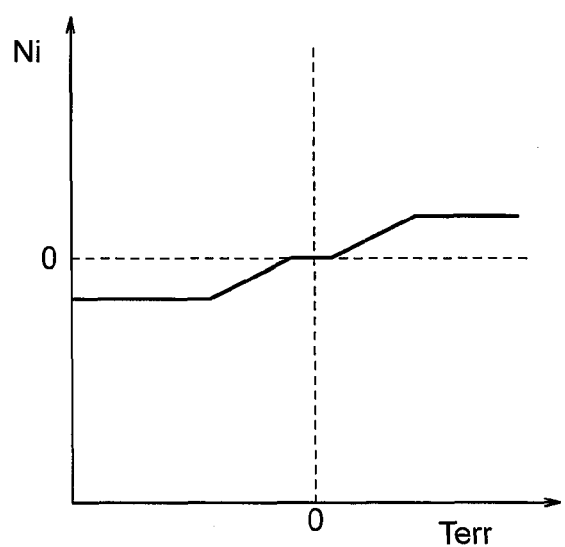
FIG. 11 is a graph showing an example of setting of further another map of the rpm control device for the general-purpose engine according to the first embodiment of the present invention.
Figure 12:
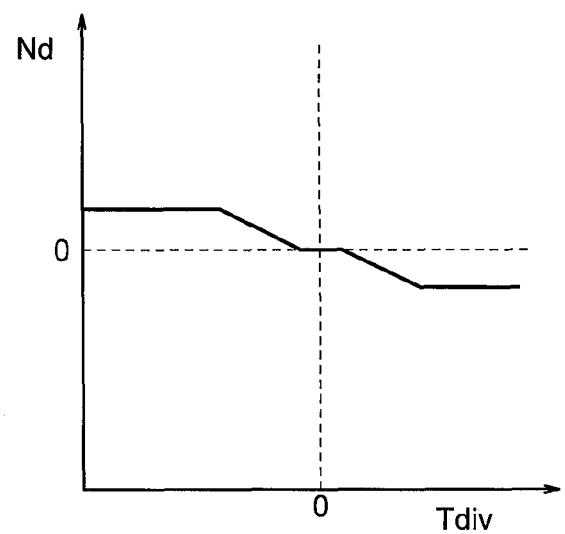
FIG. 12 is a graph showing an example of setting of further another map of the rpm control device for the general-purpose engine according to the first embodiment of the present invention.

Next, in Steps S205 to S207, the target horsepower-limiting rpm calculating section 26 performs the feedback control (PID control) so that the generated torque Tnow becomes equal to or smaller than the torque-limit value Tlim. A proportional gain Np, an integral gain Ni, and a derivative gain Nd of the PID control are respectively obtained by retrieving (making searches) through preset proportional-gain map MAP5, integral-gain map MAP6, and derivative-gain map MAP7. FIGS. 10 to 12 show examples of the proportional-gain map MAP5, the integral-gain map MAP6, and the derivative-gain map MAP7 in the case where the horsepower-limiting rpm is obtained by the PID control.

As shown in FIG. 10, a value of the proportional gain Np is set in advance for each value of the torque deviation Terr on the proportional-gain map MAP5. Therefore, the value of the proportional gain Np can be uniquely obtained from the value of the torque deviation Terr.

As shown in FIG. 11, a value of the integral gain Ni is set in advance for each value of the torque deviation Terr on the integral-gain map MAP6. Therefore, the value of the integral gain Ni can be uniquely obtained from the value of the torque deviation Terr.

As shown in FIG. 12, a value of the derivative gain Nd is set in advance for each value of the torque derivative value Tdiv on the derivative-gain map MAP7. Therefore, the value of the derivative gain Nd can be uniquely obtained from the value of the torque derivative value Tdiv.

Next, in Step S208, the target horsepower-limiting rpm calculating section 26 obtains the final target horsepower-limiting rpm Nlim by the following Expression (3) based on the proportional gain Np, the integral gain Ni, and the derivative gain Nd. However, it is supposed that the target horsepower-limiting rpm Nlim does not become less than 0.

$$Nlim = Np + \Sigma Ni + Nd \quad (3)$$

After the target horsepower-limiting rpm Nlim is obtained by the process flow of FIG. 4, the process proceeds to Step S106 of FIG. 3 where the target rpm No is obtained in the target-rpm calculating section 27. The target rpm No is obtained by the following Expression (4). Specifically, the basic target rpm Nb obtained in Step S101 is multiplied by the rotation decrease rate K obtained in Step S103 or S104. By subtracting the target horsepower-limiting rpm Nlim obtained in Step S105 (process flow of FIG. 4) from the result of multiplication, the target horsepower-limiting rpm Nlim is obtained.

$$No = Nb \times K - Nlim \quad (4)$$

After the target rpm No is obtained by the process flow of FIG. 3, the isochronous control is performed so that the rpm RE of the engine 1 becomes equal to the target rpm No. As described above, in the case of the compression-ignition engine, the feedback control is performed so that the engine rpm RE becomes equal to the target rpm No by increasing or reducing the fuel amount. On the other hand, in the case of the spark-ignition engine, the engine rpm RE cannot be always made equal to the target rpm over the entire rotation range only by adjusting the fuel amount. Therefore, the feedback control is performed by controlling the air amount supplied to the engine 1 using the throttle actuator (electronic throttle) 7a. Referring to FIG. 5, a method of making the rpm of the engine 1 equal to the target rpm No by using the throttle actuator (electronic throttle) 7a is described.

As illustrated in FIG. 5, for performing the feedback control (PID control) so that the current engine rpm RE becomes equal to the target rpm. No, the target throttle opening-degree calculating section 28 first obtains a rotation deviation Nerr between the target rpm No and the engine rpm RE and a rotation derivative value Ndiv in Steps S301 and S302. The rotation deviation Nerr and the rotation derivative value Ndiv are respectively obtained by the following Expressions (5) and (6).

$$Nerr = No - RE \quad (5)$$

$$Ndiv = dRE/dt \quad (6)$$

Figure 13:
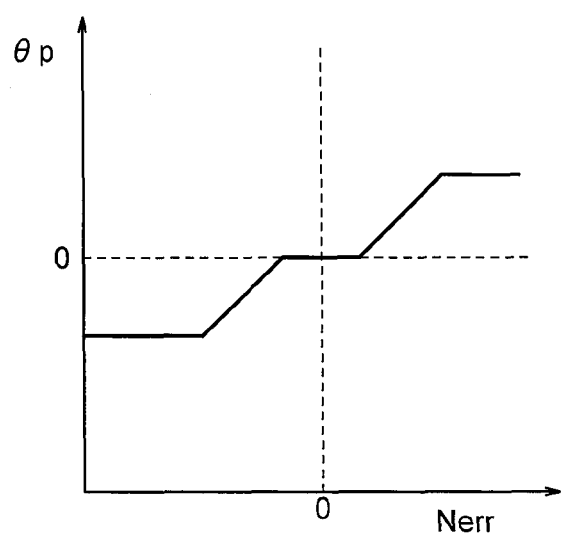
FIG. 13 is a graph showing an example of setting of further another map of the rpm control device for the general-purpose engine according to the first embodiment of the present invention.
Figure 14:
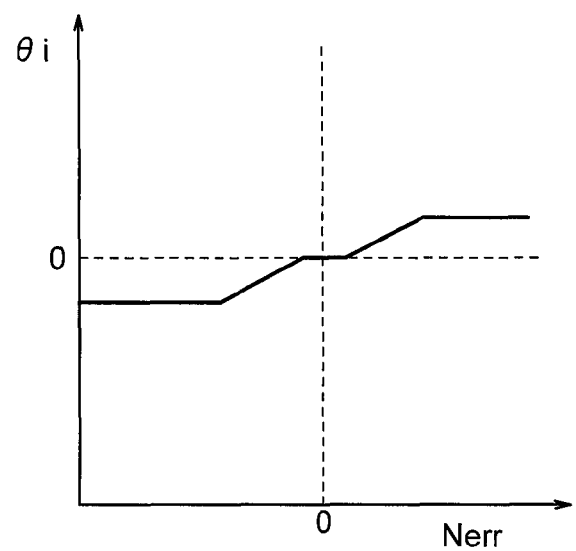
FIG. 14 is a graph showing an example of setting of further another map of the rpm control device for the general-purpose engine according to the first embodiment of the present invention.
Figure 15:
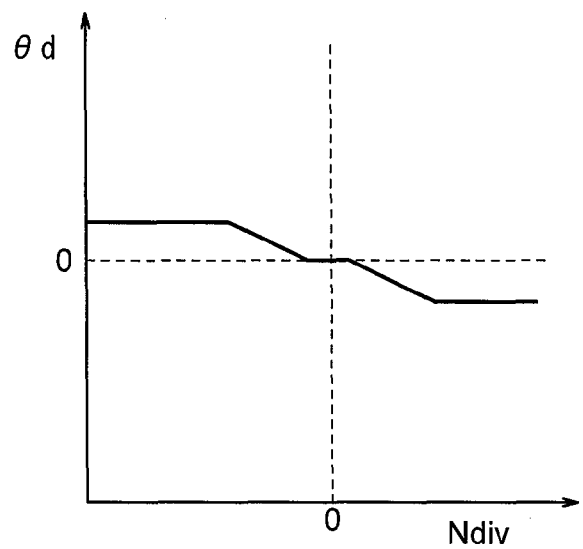
FIG. 15 is a graph showing an example of setting of further another map of the rpm control device for the general-purpose engine according to the first embodiment of the present invention.

Next, in Steps S303 to S305, the target throttle opening-degree calculating section 28 performs the feedback control (PID control) so that the current engine rpm RE becomes equal to the target rpm No. A proportional gain $\theta p$, an integral gain $\theta i$, and a derivative gain $\theta d$ of a target throttle opening degree of the PID control are obtained by making searches by using the rotation deviation Nerr and the rotation derivative value Ndiv through preset proportional-gain map MAP8, integral-gain map MAP9, and derivative-gain map MAP10, respectively. FIGS. 13 to 15 show examples of setting of the proportional-gain map MAP8, the integral-gain map MAP9, and the derivative-gain map MAP10 in the case where the target throttle opening degree is obtained by the PID control.

As shown in FIG. 13, a value of the proportional gain $\theta p$ is set for each value of the rotation deviation Nerr on the proportional-gain map MAP8. Therefore, the value of the proportional gain $\theta p$ can be uniquely obtained from the value of the rotation deviation Nerr.

As shown in FIG. 14, a value of the integral gain $\theta i$ is set for each value of the rotation deviation Nerr on the integral-gain map MAP9. Therefore, the value of the integral gain $\theta i$ can be uniquely obtained from the value of the rotation deviation Nerr.

As shown in FIG. 15, a value of the derivative gain $\theta d$ is set for each value of the rotation derivative value Ndiv on the derivative-gain map MAP10. Therefore, the value of the derivative gain $\theta d$ can be uniquely obtained from the value of the rotation derivative value Ndiv.

Then, in Step S306, the target throttle-value opening-degree calculating section 28 obtains the target throttle opening degree eo for driving the throttle actuator (electronic throttle) 7a by the following Expression (7) based on the proportional gain $\theta p$, the integral gain $\theta i$, and the derivative gain $\theta d$. However, the target throttle opening degree $\theta o$ is limited by the range of driving of the throttle (for example, 0.5 V to 4.5 V).

$$\theta o = \theta p + \Sigma \theta i + \theta d \quad (7)$$

After the target throttle opening degree $\theta o$ is calculated by the process flow of FIG. 5, the ECU 17 performs the feedback control by comparing an actual opening degree (angle $\theta t$) of the throttle valve 7 and the target throttle opening degree $\theta o$ to control the throttle actuator (electronic throttle) 7a so that the actual opening degree of the throttle valve 7 becomes equal to the target throttle opening degree $\theta o$.

As described above, in the first embodiment, in the spark-ignition engine including the throttle actuator (electronic throttle) 7a, the rotation decrease rate K is calculated by using the basic target rpm Nb and the engine load Ce, which are calculated from the input of the accelerator operation, as parameters. The target rpm No is obtained as a value based on the product of the basic target rpm Nb and the rotation decrease rate K. The throttle actuator (electronic throttle) 7a is controlled to adjust the intake-air amount so as to achieve the obtained target rpm No. In this manner, the isochronous control can be realized.

Moreover, the torque-limit value Tlim is set for each target rpm No. When the generated torque Tnow of the engine exceeds the torque-limit value Tlim, the maximum output horsepower of the engine can be limited by reducing the target rpm K.

Although the basic target rpm Nb is obtained from the accelerator position $\theta aps$ in Step S101 of FIG. 3, the basic target rpm Nb is determined in accordance with a state of the switching operation in the case of a system in which the driver determines the target rpm by the operation of a switch instead of using the accelerator position.

In the case of a system in which the target rpm of the driver is transmitted, not by the accelerator operation, but through CAN communication, the target rpm received through the CAN may be used as the basic target rpm Nb.

Further, although the target horsepower-limiting rpm Nlim is obtained by the PID control in FIG. 4, the target horsepower-limiting rpm may be obtained by PI control, P control, or I control instead of the PID control.

Although the target throttle opening degree is obtained by the PID control in FIG. 5, the target throttle opening degree may be obtained by the PI control, the P control or the I control instead of the PID control.

According to the configuration described above, in the general-purpose engine formed of the spark-ignition engine, the target rpm is reduced as compared with that during a normal operation when the droop control is selected. By performing the isochronous control based on the reduced target rpm, the droop control can be realized in a pseudo-manner.

Further, because of the configuration in which the droop control is performed in a pseudo-manner by performing the isochronous control with the reduced target rpm, the control gain is not required to be adapted to the droop control and only the gain for the isochronous control is required to be adapted. Therefore, the steps of adaptation can be reduced.

It is apparent that the present invention is not limited to the configuration described above and encompasses the combination of executable configurations.

As described above, the rpm control device for the general-purpose engine according to the present invention includes means for computing the injection amount for controlling the air/fuel ratio to the theoretical air/fuel ratio based on the air amount supplied to the engine 1 and supplying the fuel from the injector 12 based on the injection amount, means for computing optimal ignition timing from the engine rpm RE and the engine load Ce to perform ignition at the spark plug 6, and means for controlling the throttle actuator (electronic throttle) 7a capable of adjusting the air amount to be supplied to the engine 1 to an optimal amount, the rpm control device being configured to calculate the target throttle opening degree θo so as to eliminate the deviation between the target rpm No and the actual rpm RE in the feedback control (PID control) based on the deviation at the time of isochronous control, and calculate the rotation decrease rate K from the actual rpm RE and the engine load Ce and obtain the target rpm No by multiplying the basic target rpm. Nb from the driver by the rotation decrease rate K at the time of droop control to perform the isochronous control so as to achieve the obtained target rpm No, thereby performing the pseudo-droop control.

The rpm control device for the general-purpose engine according to the present invention includes the rpm detecting section (not shown) for detecting the rpm of the engine 1, the intake-air temperature sensor 11 (intake-air temperature detecting section) for detecting the temperature of the intake air of the engine 1, the throttle sensor 8 (intake-air detecting section) for detecting the intake-air amount or the intake-pressure sensor 10 (intake-air detecting section) for detecting the intake pressure of the intake air, the engine-parameter calculating section 22 (engine-load detecting section) for detecting the load of the engine 1 by using the temperature of the intake air of the engine 1, detected by the intake-air temperature detecting section, and the intake-air amount or the intake pressure detected by the intake-air detecting section, the basic target-rpm calculating section 23 for calculating the basic target rpm Nb of the engine 1 based on the input of the accelerator operation by the driver, the target decrease-rate calculating section 24 for calculating the rotation decrease rate K based on the basic target rpm Nb and the load Ce of the engine 1, the target-rpm calculating section 27 for calculating the target rpm No based on the basic target rpm Nb and the rotation decrease rate K, the target throttle opening-degree calculating section 28 for calculating the rotation deviation between the rpm of the engine 1 and the target rpm No and calculating the target throttle opening degree of the throttle actuator (electronic throttle) 7a so that the rotation deviation falls within a preset allowable range, and the electronic-throttle control section 29 for controlling the opening degree of the throttle actuator (electronic throttle) 7a so that the actual opening degree of the electronic throttle becomes equal to the target throttle opening degree, the rpm control device being configured to perform the pseudo-droop control for decreasing the rpm of the engine 1 along with the increase in the load Ce of the engine by controlling the intake-air amount supplied to the engine 1 by using the throttle actuator (electronic throttle) 7a to perform the control with the isochronous control method so that the rpm of the engine 1 becomes equal to the target rpm No.

According to the configuration described above, in the present invention, the basic target rpm Nb and the load (charging efficiency) Ce of the engine are calculated. With use of the rotation decrease rate K which is preset on the map for each value of the basic target rpm Nb and each value of the load (charging efficiency) Ce of the engine, the basic target rpm Nb is corrected so that the rotation decrease rate K is set smaller as the load (charging efficiency) Ce of the engine becomes larger. In this manner, the pseudo-droop control for automatically reducing the target rpm as the engine load Ce becomes higher (target rpm (No)=basic target rpm (Nb)×rotation decrease rate (K)) is enabled even when the target rpm set value (basic target rpm (Nb)) from the driver is the same value.

In this manner, even with the same PID gain setting as that for the isochronous control method, the pseudo-droop control can be performed. Moreover, a rotation decrease degree (droop rate) can be freely set for each target rpm in accordance with the magnitude of the load (charging efficiency) Ce. Therefore, the output characteristics of the engine 1 can be easily set for the adaptation. Further, the droop control is realized by adjusting the basic target rpm Nb. Therefore, the droop control is not affected by a variation between the engines 1. Thus, it is not necessary to verify and adjust variations in characteristics of each individual engine 1. Therefore, the number of steps of design and fabrication can be reduced. As a result, the droop control with high accuracy can be performed.

Further, in this embodiment, the method of calculating the target rpm No by the target-rpm calculating section 27 includes a first calculation method (used at the time of droop control) and a second calculation method (used at the time of isochronous control). The rpm control device for the general-purpose engine further includes a switching section for switching the method of calculating the target rpm No by the target-rpm calculating section 27 to one of the first calculation method and the second calculation method. When the calculation method is set to the first calculation method by the switching section, the target-rpm calculating section 27 calculates the target rpm by multiplying the basic target rpm Nb by the rotation decrease rate K obtained in the rotation decrease-rate calculating section 24. When the calculation method is set to the second calculation method, the target-rpm calculating section 27 multiplies the basic target rpm Nb by the rotation decrease rate which is set to 1 (K=1) so as to directly output the value of the basic target rpm Nb as the target rpm No.

In this manner, the selection between the isochronous control and the droop control depending on the purpose of use of the equipment in which the general-purpose engine is mounted is facilitated. As a result, various kinds of equipments can mount the general-purpose engine. Moreover, the type of control can be switched in accordance with the purpose of use of the operation, and therefore the merchantability (functions) of the general-purpose engine can be enhanced.

Further, in this embodiment, the rpm control device for the general-purpose engine further includes the target horsepower-limiting rpm calculating section 26 for presetting the torque-limit value Tlim for each value of the target rpm No on the map and calculating the target horsepower-limiting rpm Nlim for reducing the value of the target rpm No so that the generated torque becomes equal to or smaller than the torque-limit value Tlim in the case where the generated torque of the engine 1 exceeds the torque-limit value Tlim at the time of rpm control with the target rpm No calculated by the target-rpm calculating section 27. The target-rpm calculating section 27 outputs the value obtained by subtracting the target horsepower-limiting rpm Nlim from the calculated target rpm No as the target rpm No when the target horsepower-limiting rpm Nlim is input from the target horsepower-limiting rpm calculating section 26. The target horsepower-limiting rpm calculating section 26 obtains the deviation Terr between the generated torque Tnow and the torque-limit value Tlim and the derivative value Tdiv of the generated torque Tnow to calculate the target horsepower-limiting rpm Nlim based on the deviation Terr and the derivative value Tdiv.

In this manner, even in the spark-ignition engine, the maximum output horsepower of the engine 1 can be easily limited as in the case with the diesel engine characteristics.

The general-purpose engine is mounted in various types of equipment such as vessels, farm-work equipment, and transport vehicles. Therefore, the maximum output horsepower is required to be changed in accordance with the equipment in which the general-purpose engine is mounted. This is because the input limit value of the driving system differs depending on the types of the equipment in which the general-purpose engine is mounted and vehicles. For example, in the case of one vessel, the driving system can withstand the output up to 50 (PS). However, for the driving system of one grass cutter, 30 (PS) is a maximum input value of the driving system. For mounting the common general-purpose engine in various types of equipment described above, it is required that the main body of the engine be configured to be common to the various types of equipment and only data on the engine control (ECU) side be changed for each of the types of equipment.

In order to realize the configuration described above, the mechanism which enables the adaptation and the setting of the maximum value of the generated torque for each target rpm is provided. Then, when the actual generated torque of the engine exceeds the maximum generated torque, a correction is made so that the target rpm is lowered. In this manner, the engine can be used while limiting the horsepower so that the horsepower becomes equal to or smaller than the maximum generated horsepower of the engine.

As a result, even in the case where the target rpm is set to, for example, 3,500 rpm, the target rpm is corrected so as to be gradually reduced when the load applied to the engine is increased to result in the actual torque higher than the set maximum generated torque. In addition, the rpm control is performed by the isochronous control, and therefore the engine rpm RE is also reduced. Thus, the target rpm is reduced to the rpm at which the torque is not limited by the feedback control. The maximum generated horsepower is reduced because of the lowered rpm. As a result, the maximum torque of the engine can be generated as the generated torque in the range of rotation at a low speed. Moreover, the maximum generated horsepower can be limited.

Moreover, in this embodiment, the rpm control device for the general-purpose engine further includes the generated-torque calculating section 25 for calculating the generated torque Tnow. The generated-torque calculating section 25 presets the value of the generated torque Tnow for each value of the rpm RE and each value of the load Ce of the engine 1 on the map so as to calculate the generated torque from the engine rpm RE and the load Ce of the engine 1.

In this manner, the engine generated-torque characteristic (Tnow) is previously set by the adaptation to the map with the rpm RE and the load Ce of the engine 1. The engine generated torque can be easily detected in the pseudo-manner in accordance with the operating state of the engine. As a result, the detection of the maximum generated horsepower of the engine and the limit control thereof can be easily performed.

What claimed is:

1. An rpm control device for a general-purpose engine, for controlling an intake-air amount to be supplied to an engine by using an electronic throttle to control an rpm of the engine, the rpm control device comprising:
   an rpm detecting section for detecting the rpm of the engine;
   an intake-air temperature detecting section for detecting a temperature of intake air of the engine;
   an intake-air detecting section for detecting one of an intake-air amount and an intake pressure of the intake air;
   an engine-load detecting section for detecting a load of the engine by using the temperature of the intake air of the engine, detected by the intake-air temperature detecting section, and one of the intake-air amount and the intake pressure, detected by the intake-air detecting section;
   a basic target-rpm calculating section for calculating a basic target rpm of the engine based on input of an accelerator operation;
   a target decrease-rate calculating section for calculating a rotation decrease rate based on the basic target rpm and the load of the engine;
   a target-rpm calculating section for calculating a target rpm based on the basic target rpm and the rotation decrease rate;
   a target throttle opening-degree calculating section for calculating a rotation deviation between the rpm of the engine and the target rpm so as to calculate a target throttle opening degree of the electronic throttle based on the rotation deviation; and
   an electronic-throttle control section for controlling an opening degree of the electronic throttle so that an actual opening degree of the electronic throttle becomes equal to the target throttle opening degree,
   wherein the target rpm is made smaller than the basic target rpm by reducing the rotation decrease rate in accordance with an increase in the load of the engine, and isochronous control is performed by using the electronic throttle so as to achieve the obtained target rpm to perform droop control in a pseudo-manner.

2. An rpm control device for a general-purpose engine, according to claim 1, wherein:
   a method of calculating the target rpm by the target-rpm calculating section comprises a first calculation method and a second calculation method;
   the rpm control device further comprises a switching section for switching the method for calculating the target rpm by the target-rpm calculating section to one of the first calculation method and the second calculation method;
   the target-rpm calculating section calculates the target rpm by multiplying the basic target rpm by the rotation decrease rate when the first calculation method is set by the switching section; and
   the target-rpm calculating section sets the rotation decrease rate to 1 and calculates the target rpm by multiplying the basic target rpm by 1 when the second calculation method is set by the switching section.

3. An rpm control device for a general-purpose engine according to claim 1, further comprising a target limiting-rpm calculating section for presetting a torque-limit value for each value of the target rpm and calculating a limiting rpm for reducing the value of the target rpm so that a generated torque of the engine becomes equal to or smaller than the torque-limit value when the generated torque exceeds the torque-limit value of the target rpm at a time of rpm control with the target rpm calculated by the target-rpm calculating section,
   wherein the target-rpm calculating section outputs a value obtained by subtracting the limiting rpm from the calculated target rpm as the target rpm when the limiting rpm is input from the target limiting-rpm calculating section.

4. An rpm control device for a general-purpose engine according to claim 3, wherein the target limiting-rpm calculating section obtains a deviation between the generated torque and the torque-limit value and a derivative value of the generated torque so as to calculate the limiting rpm based on the deviation and the derivative value.

5. An rpm control device for a general-purpose engine according to claim 3, further comprising a generated-torque calculating section for calculating the generated torque, wherein the generated-torque calculating section presets a value of the generated torque for each value of the rpm and each value of the load of the engine and obtains the generated torque from the rpm output from the rpm detecting section and the load output from the engine-load detecting section in accordance with the setting.

6. An rpm control method for a general-purpose engine, for controlling an intake-air amount to be supplied to an engine by using an electronic throttle to control an rpm of the engine, the rpm control method comprising:

an rpm detecting step of detecting the rpm of the engine;

an intake-air temperature detecting step of detecting a temperature of intake air of the engine;

an intake-air detecting step of detecting one of an intake-air amount and an intake pressure of the intake air;

an engine-load detecting step of detecting a load of the engine by using the temperature of the intake air of the engine, detected in the intake-air temperature detecting step, and one of the intake-air amount and the intake pressure, detected in the intake-air detecting step;

a basic target-rpm calculating step of calculating a basic target rpm of the engine based on input of an accelerator operation;

a target decrease-rate calculating step for calculating a rotation decrease rate based on the basic target rpm and the load of the engine;

a target-rpm calculating step of calculating a target rpm based on the basic target rpm and the rotation decrease rate;

a target throttle opening-degree calculating step of calculating a rotation deviation between the rpm of the engine and the target rpm so as to calculate a target throttle opening degree of the electronic throttle based on the rotation deviation; and an electronic-throttle control step of controlling an opening degree of the electronic throttle so that an actual opening degree of the electronic throttle becomes equal to the target throttle opening degree, wherein the target rpm is made smaller than the basic target rpm by reducing the rotation decrease rate in accordance with an increase in the load of the engine, and isochronous control is performed by using the electronic throttle so as to achieve the obtained target rpm to perform droop control in a pseudo-manner.

* * * * *